United States Patent
Reuter et al.

(10) Patent No.: US 8,408,233 B2
(45) Date of Patent: Apr. 2, 2013

(54) FLOW CONTROL SYSTEM AND METHOD FOR CONTROLLING TWO POSITIVE DISPLACEMENT PUMPS

(75) Inventors: Charles E. Reuter, Granby, CT (US); Aaron V. Price, Westfield, MA (US); Todd Haugsjaahabink, Springfield, MA (US); Yukinori Sato, Windsor Locks, CT (US); John J. Wichowski, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 101 days.

(21) Appl. No.: 13/051,108

(22) Filed: Mar. 18, 2011

(65) Prior Publication Data

US 2012/0234014 A1   Sep. 20, 2012

(51) Int. Cl.
*G05D 11/02*  (2006.01)
*E03B 5/00*  (2006.01)
*F16K 31/12*  (2006.01)
*F04B 23/04*  (2006.01)

(52) U.S. Cl. .............. 137/115.23; 137/563; 137/565.14; 137/565.33; 417/288; 417/428

(58) Field of Classification Search ............ 137/565.14, 137/565.15, 565.33, 565.35, 563, 115.18, 137/115.21, 115.23; 417/288, 428; 60/39.281, 60/734, 736
See application file for complete search history.

(56) References Cited

U.S. PATENT DOCUMENTS

| | | | |
|---|---|---|---|
| 3,696,612 A | 10/1972 | Berman | |
| 3,899,877 A | 8/1975 | Flanigan et al. | |
| 4,151,710 A | 5/1979 | Griffin et al. | |
| 4,245,964 A * | 1/1981 | Rannenberg | 417/287 |
| 4,354,345 A | 10/1982 | Dreisbach, Jr. et al. | |
| 4,498,525 A | 2/1985 | Smith | |
| 4,618,037 A | 10/1986 | Nishikawa et al. | |
| 4,741,152 A | 5/1988 | Burr et al. | |
| 4,809,499 A | 3/1989 | Dyer | |
| 4,876,880 A | 10/1989 | Dyer | |
| 4,899,535 A | 2/1990 | Dehan et al. | |
| 4,910,956 A | 3/1990 | Legore et al. | |
| 5,118,258 A | 6/1992 | Martin | |
| 5,156,332 A | 10/1992 | Dyer | |
| 5,159,808 A | 11/1992 | Kast | |
| 5,313,790 A | 5/1994 | Barr | |
| 5,337,553 A | 8/1994 | Barr | |
| 5,339,636 A | 8/1994 | Donnelly et al. | |
| 5,442,922 A | 8/1995 | Dyer et al. | |
| 5,448,882 A | 9/1995 | Dyer et al. | |
| 5,456,574 A | 10/1995 | Donnelly et al. | |
| 5,495,715 A | 3/1996 | Loxley | |
| 5,702,229 A | 12/1997 | Moss et al. | |
| 5,715,674 A | 2/1998 | Reuter et al. | |

(Continued)

*Primary Examiner* — Craig Schneider
*Assistant Examiner* — Atif Chaudry
(74) *Attorney, Agent, or Firm* — Kinney & Lange, P.A.

(57) ABSTRACT

A fuel flow system for a gas turbine engine includes a first pump, a second pump, a bypass loop, an integrating bypass valve and a pilot valve. The first pump connects to an actuator and a metering valve. The second pump connects to the metering valve and is arranged in parallel with the first pump. The bypass loop recycles fuel flow from the first pump and the second pump to inlets of the first pump and second pump integrating bypass valve includes first and second windows. The first window regulates fuel from the first pump through the bypass loop and the second window that regulates fuel from the second pump through the bypass loop. The pilot valve controls the size of the first and second windows.

17 Claims, 1 Drawing Sheet

U.S. PATENT DOCUMENTS

| | | |
|---|---|---|
| 5,896,737 A | 4/1999 | Dyer |
| 6,022,197 A | 2/2000 | Cygnor et al. |
| 6,059,537 A | 5/2000 | Cygnor |
| 6,189,313 B1 | 2/2001 | Cass et al. |
| 6,250,894 B1 | 6/2001 | Dyer et al. |
| 6,251,270 B1 | 6/2001 | Blot-Carretero et al. |
| 6,321,527 B1 | 11/2001 | Dyer et al. |
| 6,446,437 B1 | 9/2002 | Smith |
| 6,487,847 B1 | 12/2002 | Snow et al. |
| 6,651,441 B2 | 11/2003 | Reuter et al. |
| 7,401,461 B2 | 7/2008 | Eick et al. |
| 8,128,378 B2 * | 3/2012 | Rowan et al. ............... 417/222.1 |
| 2008/0251142 A1 * | 10/2008 | Ogino et al. ............... 137/512.3 |

* cited by examiner

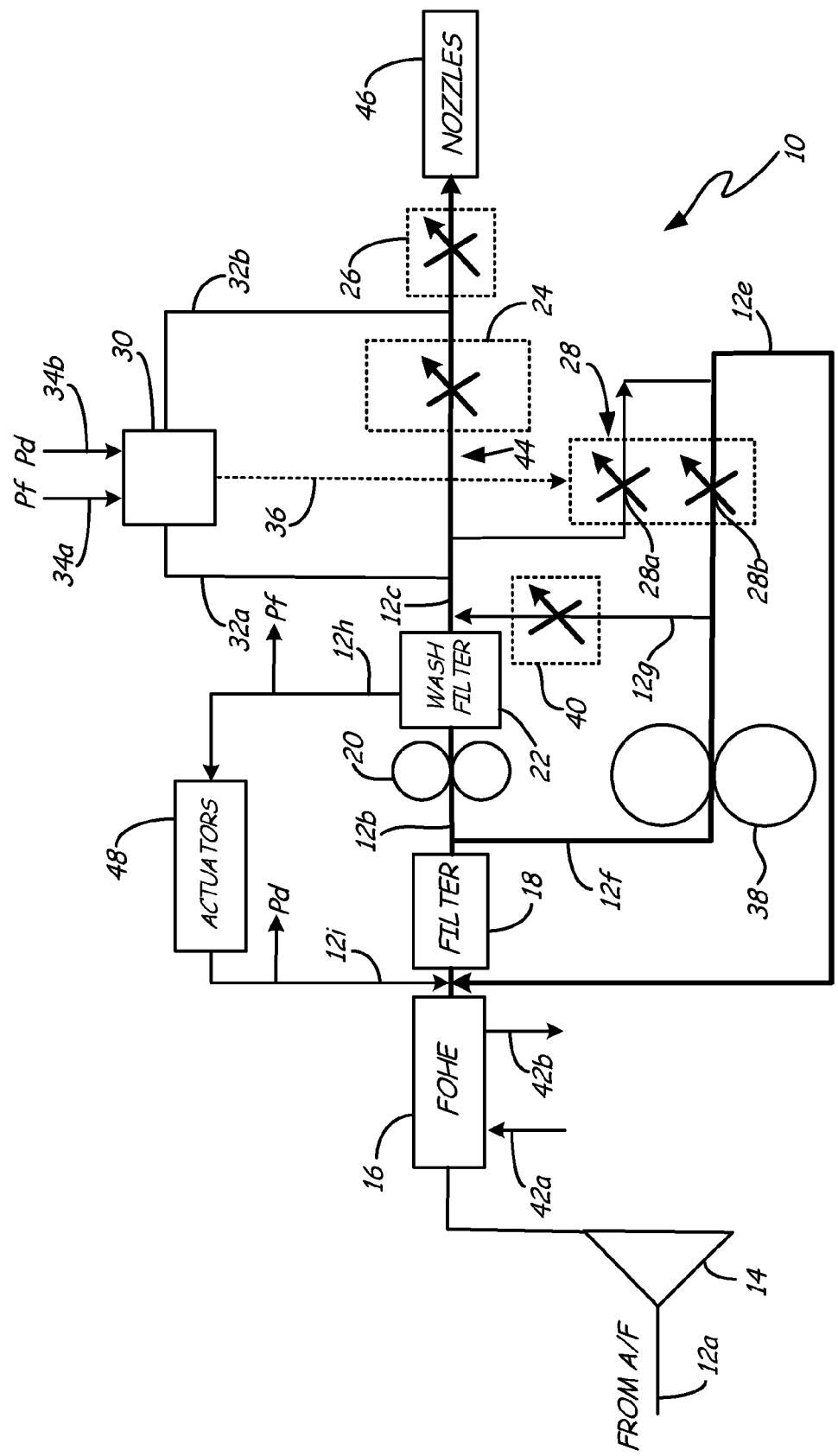

FLOW CONTROL SYSTEM AND METHOD FOR CONTROLLING TWO POSITIVE DISPLACEMENT PUMPS

CROSS-REFERENCE TO RELATED APPLICATION(S)

Reference is made to application Ser. No. 13/051,091 entitled "DUAL PUMP FUEL FLOW SYSTEM FOR A GAS TURBINE ENGINE" which is filed on even date and is assigned to the same assignee as this application.

BACKGROUND

In a gas turbine engine, oil is distributed to various components, such as bearings, for cooling and lubrication. The oil is heated as it circulates around or through these various components. The oil can be cooled by cooling air or fuel flowing to the combustion chamber. Cooling air is typically taken from the fan, which reduces thrust of the engine. Fuel flowing to the combustion chamber can also be used to cool the hot circulating oil. Rejecting heat from the oil into the fuel incurs few of the penalties of air cooling. However, the amount of rejected heat is limited by the maximum temperature tolerable by the fuel.

The fuel system of a gas turbine engine includes a fuel pump for pressurizing and transporting the fuel through the system to the combustion chamber. The fuel pump is generally a boost stage and single positive displacement main stage which is attached to the gearbox such that the speed of the main fuel pump is proportional to the engine speed. At certain conditions, such as cruise, the engine operates at a relatively high speed while a relatively low fuel flow is required. Further, the main fuel pump stage is typically sized by high power or start conditions, resulting in extra flow capacity at all other engine operation conditions. In this way, the main fuel pump stage results in excess fuel flow. The excess fuel is recycled through a bypass loop to the low pressure side of the main pump. At low fuel requirements, the fuel may be recycled several times before being sent to the combustion chamber. The combination of recycling excess fuel and pump inefficiencies increases the temperature of the fuel. This additional heat limits the amount of heat that can be rejected into the fuel from the circulating oil. Reducing the amount of heat rejected into the fuel by the fuel pump would improve engine performance. Further, a large amount of time spent is in the cruise condition during a flight, and reducing the amount of heat rejected into the fuel by the main pump during the cruise condition may have a larger impact on engine performance than similar reductions during other flight conditions.

SUMMARY

A fuel flow system for a gas turbine engine includes a first pump, a second pump, a bypass loop, an integrating bypass valve and a pilot valve. The first pump connects to an actuator. The second pump connects to the actuator and is arranged in parallel with the first pump. The bypass loop recycles fuel flow from the first pump and the second pump to inlets of the first pump and second pump. The integrating bypass valve includes first and second windows. The first window regulates fuel from the first pump through the bypass loop and the second window regulates fuel from the second pump through the bypass loop. The pilot valve controls the size of the first and second windows.

BRIEF DESCRIPTION OF THE DRAWINGS

The FIGURE is a schematic representation of a fuel flow system.

DETAILED DESCRIPTION

The FIGURE is a schematic representation of fuel flow system 10 for a gas turbine engine onboard an aircraft. Fuel flow system 10 receives fuel through conduit 12a from the air frame (A/F). In one example, fuel flow system 10 receives fuel from a fuel tank onboard the aircraft. Boost pump 14 increases the pressure of the fuel and supplies the fuel to fuel-oil heat exchanger (FOHE) 16 and filter 18. The fuel is then supplied to the system comprising cruise pump 20, wash filter 22, metering valve (MV) 24, minimum pressure and shut off valve (MPSOV) 26, integrating bypass valve 28 (including cruise bypass window 28a and idling bypass window 28b), pressure control or pilot valve 30 (including upstream pressure signal line 32a, downstream pressure signal line 32b, high pressure line 34a, low pressure line 34b, and control signal 36), idling pump 38, check valve 40. Conduits 12a, 12b, 12c, 12e, 12f, 12g, 12h, and 12i connect the components so that fuel flows from boost pump 14 to nozzles 46 of a combustion chamber.

Boost pump 14 receives and pressurizes fuel from the air frame (A/F). Boost pump 14 can be a typical centrifugal pump designed to operate at an essentially constant pressure for a given engine speed. The fuel flows from boost pump 14 to FOHE 16.

Lubricating and cooling oil for engine components, such as the main engine bearings, circulates through an oil loop represented by inlet conduit 42a and outlet conduit 42b. Hot oil from the engine enters FOHE 16 through inlet conduit 42a. The oil rejects heat into the fuel flowing through FOHE 16. The cooled oil exits FOHE 16 through outlet conduit 42b and is directed back to the engine components. FOHE 16 transfers heat from the oil to the fuel. The amount of heat transferred to the fuel is limited by the maximum temperature tolerable by the downstream components. Decreasing heat rejection by components downstream of FOHE 16 enables more heat to be rejected into the fuel by the oil in FOHE 16.

After FOHE 16, the fuel flows through filter 18. Filter 18 protects contaminate sensitive components of fuel flow system 10. Filter 18 filters contaminants that might enter fuel flow system 10 through the fuel.

After filter 18, the fuel is divided between cruise pump 20 and idling pump 38, which operate in parallel. A portion of the fuel flows through conduit 12b to cruise pump 20. Cruise pump 20 can be a positive displacement pump that is sized, as a minimum, to meet the maximum burn flow requirements at cruise condition plus parasitic internal leakage losses in the fuel system. Flow from cruise pump 20 is divided between actuators 48 and engine burner nozzles 46. Cruise pump 20 increases the pressure of the fuel sufficiently to satisfy the load requirements of the actuators 48 while also providing fuel to the engine burner nozzles 46.

The actuators 48 can be high pressure fluid actuators which operate engine components, such as but not limited to, inlet guide vanes, bleed valves, turbine cooling valves and nozzle actuators. The minimum pressure and shutoff valve (MPSOV) 26, regulates the discharge pressure of cruise pump 20 above the inlet pressure of cruise pump 20 to assure the positive operation of the actuators 48 against their design loads. In one example, cruise pump 20 is operated at about 1724 kilopascals difference (254 psid). High pressure fuel (Pt) is provided to the actuators 48 from the discharge of cruise pump 20 through conduit 12h. Low pressure fuel (Pd) from the actuators 48 is returned through conduit 12i to a location upstream of the inlets of cruise pump 20 and idling pump 38.

Metered fuel flow path 44 is defined between cruise pump 20 and MV 24. MV 24 measures the flow of fuel to the nozzles 46. The pressure drop across the known area of MV 24 is measured by pressure control valve 30 using upstream pressure signal line 32a and downstream pressure signal line 32b. The fuel flow to the nozzles 46 is too high when the pressure drop or differential across MV 24 is higher than a specified value. Conversely, the fuel flow to the nozzles 46 is too low when pressure drop across MV 24 is lower than a specified value. As described further below, the fuel flow from cruise pump 20 and idling pump 38 through metered fuel flow path 44 is controlled based on feedback from pressure control valve 30 in order to adjust the flow of fuel to the nozzles 46.

Fuel flow from cruise pump 20 in excess of actuator and engine burn flow needs is directed through cruise bypass window 28a of integrating bypass valve 28 and through a bypass loop comprised of conduit 12e. The recycled or bypassed fuel is reintroduced into the fuel flowing to the inlets of cruise pump 20 and idling pump 38. In the FIGURE, the bypassed fuel is introduced at a location downstream of the outlet of FOHE 16. However, the bypassed fuel can be introduced at any location upstream of the inlets of cruise pump 20 and idling pump 38.

Cruise bypass window 28a is a variable restriction through which bypass fuel from cruise pump 20 flows. The area or size of cruise bypass window 28a is varied to adjust the flow of fuel from cruise pump 20 through metered fuel flow path 44 to the nozzles 46 and through the bypass loop formed by conduit 12e.

As described above, a portion of fuel from the air frame (A/F) is directed through cruise pump 20. The remaining fuel is fed to idling pump 38 through conduit 12f. Similar to cruise pump 20, idling pump 38 can be a positive displacement pump. Idling pump 38 operates in parallel with cruise pump 20 and typically has a larger capacity than cruise pump 20. The combined capacity of cruise and idling pumps 20, 38 is sized to satisfy engine burn flow, actuator transient flow and parasitic leakage flow under all engine operating conditions including starting and high power conditions. In one example, the capacity of idling pump 38 is approximately two-thirds of the total capacity of cruise pump 20 and idling pump 38. Idling pump 38 supplements the fuel flow when flow requirements exceed the capacity of cruise pump 20.

Check valve 40 and idling bypass window 28b of integrated bypass valve 28 are in fluid communication with idling pump 38. Idling bypass window 28b is a variable restriction and operates in a fashion similar to cruise bypass window 28a. Check valve 40 is designed to default to a closed position so that the fuel flow from idling pump 38 is directed through idling bypass window 28b and the bypass loop formed by conduit 12e. Check valve 40 opens when the pressure in conduit 12g is equal to or greater than the pressure in conduit 12c. When check valve 40 opens, fuel from idling pump 38 flows through metered fuel flow path 44 to the nozzles 46 and supplements the fuel flow from cruise pump 20.

When check valve 40 is closed, all fuel flow from idling pump 38 bypasses the nozzles 46 and flows through idling bypass window 28b. The bypass fuel from cruise pump 20 and idling pump 38 mix in conduit 12e. The bypass fuel is directed to a location upstream of cruise pump 20 and idling pump 38 and downstream of boost pump 14.

Integrating bypass valve 28 and pressure control valve 30 schedule the flow of fuel to the engine burner nozzles 46. Pressure control valve 30 senses pressure upstream and downstream of MV 24 through upstream and downstream pressure signal lines 32a and 32b, respectively. Pressure control valve 30 sends control signal 36 to integrating bypass valve 28 in order to vary the area or size of cruise bypass window 28a to maintain a constant pressure differential between the pressures upstream and downstream of MV 24. Pressure control valve 30 is a pilot valve that uses high and low pressure fuel (Pf and Pd, and signal lines 34a and 34b, respectively) to form control signal 36 and translate integrating bypass valve 28. High pressure fuel Pf is taken from a location downstream of cruise pump 20 and upstream of the metering valve 24. Low pressure fuel Pd is taken from a location downstream of the boost pump 14 and upstream of the inlets of cruise pump 20 and idling pump 38.

As the integrating bypass valve 28 moves or translates to maintain a constant pressure drop across MV 24, the areas or sizes of idling bypass window 28b and cruise bypass window 28a are varied together with a predetermined relationship. That is, idling bypass window 28b and cruise bypass window 28a are mechanically linked such that they vary together with a predetermined relationship. Flow perturbations are minimized because cruise bypass window 28a and idling bypass window 28b are mechanically linked. Further, integrated bypass valve 28 is formed so that cruise bypass window 28a fully closes before idling bypass window 28b (i.e., fuel from idling pump 20 cannot flow through cruise bypass window 28a). This enables all the fuel flow from cruise pump 20 to be supplemented by the fuel flow of idling pump 38 when necessary.

In fuel flow system 10, cruise pump 20 is the sole provider of the pressure and flow for both the burn path to the nozzles 46 and the flow path to the actuators 48 for some engine operating conditions, such as cruise. As discussed above, cruise pump 20 is smaller than idling pump 30 such that the majority of the displacement is on idling pump 38. Cruise pump 20 is sized to satisfy the requirements of the maximum cruise condition plus the actuator slew requirements. At thermally critical conditions such as cruise, idling pump 38 is only recirculating fuel to the outlet of FOHE 16. The minimum pressure drop of idling pump 38 can be as low as the pressure drop required for recirculating the fuel. The minimum pressure rise of idling pump 38 is not limited by the burn flow path (i.e., the requirements of the flow path to the nozzles 46 and actuator requirements). In fuel flow system 10, at thermally critical operating conditions such as cruise, cruise pump 20 is operated at a higher pressure than idling pump 38. However, the higher pressure is across a small portion of the total displacement of cruise pump 20 plus idling pump 38. The larger portion of the displacement is across idling pump 38 which is operating at a relatively low pressure. For example, cruise pump 20 can be operated at about 1724 kilopascals difference (about 254 psid) and idling pump 38 can be operated at about 517 kilopascals difference (about 75 psid). Relative to a conventional single pump system where the higher pressure rise (254 psid) would be required to be across the total pump displacement, the design of fuel flow system 10 reduces the horsepower required at cruise conditions and the amount of heat rejected by the pumps into the fuel.

Cruise bypass window 28a and idling bypass window 28b are variable restrictions. Closing cruise bypass window 28a increases the restriction and reduces bypass flow from cruise pump 20, thus making more fuel flow available to satisfy engine burn and actuator requirements. Idling bypass window 28b operates in a similar manner. At cruise condition when the fuel flow demand is very low, the fuel flow demand is satisfied entirely by the fuel flow from cruise pump 20. As described above, cruise pump 20 is sized to meet the requirements of the maximum cruise condition and the actuator slew requirements. Further, at the cruise condition, idling bypass window 28b has a low restriction such that the opening in idling bypass window 28b is large and approximately all of the fuel from idling pump 38 passes through idling bypass window 28b to the bypass loop comprised of conduit 12e. The low restriction of idling bypass window 28b minimizes the pressure rise across idling pump 38 at the cruise condition and reduces the amount of heat rejected into the fuel by idling pump 38.

When the demand for fuel flow increases, cruise bypass window 28a is variably restricted based on control signal 36 from pressure control valve 30. Increasing the restriction of cruise bypass window 28a reduces fuel flow from cruise pump 20 through conduit 12e of the bypass loop and increases the flow of fuel from cruise pump 20 through main fuel flow path 44 to the nozzles 46. The maximum capacity of cruise pump 20 is reached when cruise bypass window 28a is completely restricted such that all fuel from cruise pump 20 flows to the nozzles 46. Because cruise bypass window 28a and idling bypass window 28b are mechanically linked, the timing of when idling pump 38 is brought on line can be controlled.

Integrating bypass valve 28 is translated or adjusted based on control signal 36 from pressure regulating valve 30. Pressure regulating valve 30 is a pilot valve which measures the pressure differential across metering valve 24 using upstream and downstream pressure signal lines 32a and 32b. Pressure regulating valve imports high pressure fuel Pf or low pressure fuel Pd to integrating bypass valve 28 through control signal 36. Pressure signal 36 causes integrating bypass valve 28 to move or translate and adjusts the area or restriction of cruise bypass window 28a and idling bypass window 28b.

Integrating bypass valve 28 can be a half area servo which has a stepped diameter such that integrating bypass valve 28 is in force balance when control signal 36 is halfway between high pressure Pf and low pressure Pd by the area ratio of integrating bypass valve 28. In a specific example, integrating bypass valve 28 is in force balance and does not move when the pressure differential across MV 24 is, for example, 50 psid, although it will be understood that other values can be used within the scope of the invention. If the pressure differential across MV 24 is greater than 50 psid, pressure regulating valve 30 will move such that more high pressure fuel Pf and less low pressure fuel Pd is provided such that control signal 36 has a high pressure. This causes integrating bypass valve 28 to translate or change position. When the pressure differential across MV 24 again equal 50 psid, pressure regulating valve 30 returns to null position where control signal 36 to integrating bypass valve 28 equals half way between high pressure Pf and low pressure Pd.

Pressure regulating valve 30 in conjunction with integrating bypass valve 28 is capable of regulating to a pressure setting with a significantly improved accuracy compared to a dual window regulating valve with a spring setting a regulating pressure. For a valve with a spring, the spring may cause the regulated pressure to deviate from a nominal regulated pressure setting. Other effects, such as seal friction, leakages, and unexpected flow force effects which can also cause deviations from the nominal regulated pressure setting are also eliminated by using pressure regulating valve 30 and integrating bypass valve 28.

In the current pressure regulating system, the regulated pressure is set by the preload on pressure regulating valve 30. Because pressure regulating valve 30 operates around null at any bypass condition, deviations in regulated pressure due to spring compression are almost non-existent. Pressure regulating valve 30 regulates the modulated pressure on one side of integrating bypass valve 28 using control signal 36 until the regulated pressure setting is accurately achieved.

In a conventional spring-loaded regulating valve, the regulated pressure accuracy and valve stability are two conflicting requirements. A high window gain (dA/dx), or width, tends to destabilize the valve. In order to lower the window gain, the valve stroke needs to be increased to maintain a maximum window area value. When the valve window stroke is increased, the deviation in regulated pressure tends to increase as well due to spring compression. Because of their conflicting nature, it is difficult to achieve both requirements at the same time. In the current concept, the valve window and stroke can be adjusted without considering the deviation in regulated pressure. Hence, the stability problem is made more flexible.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel flow system for a gas turbine engine, the system comprising:
   a first pump connected to a nozzle;
   a second pump connected to the nozzle and arranged in parallel with the first pump;
   a metering valve disposed downstream from the first pump and upstream from the nozzle:
   an actuator disposed downstream from the first pump and upstream from the metering valve, the actuator receiving a high pressure fluid from the first pump and returning a low pressure fluid upstream to inlets of the first pump and the second pump;
   a bypass loop that recycles fuel flow from the first pump and the second pump to the inlets of the first pump and second pump;
   an integrating bypass valve having a first window that regulates fuel from the first pump through the bypass loop and a second window that regulates fuel from the second pump through the bypass loop; and
   a pilot valve that senses a pressure drop across the metering valve and in response either directs a portion of the high pressure fluid upstream from the actuator or directs a portion of the low pressure fluid downstream from the actuator to the integrating bypass valve to control a size of the first window and a size of the second window of the integrating bypass valve.

2. The fuel flow system of claim 1, wherein the first window fully closes before the second window fully closes.

3. The fuel flow system of claim 2, wherein the first pump has a smaller capacity than the second pump.

4. The fuel flow system of claim 1, wherein the first window and the second window are mechanically linked.

5. The fuel flow system of claim 1, and further comprising:
   a check valve, which when open, directs fuel flow from the second pump to the metering valve.

6. The fuel flow system of claim 1, wherein the pilot valve directs a portion of the high pressure fluid or directs a portion of the low pressure fluid to a single side of the integrating bypass valve until a regulated pressure setting is achieved.

7. The fuel flow system of claim 1, wherein the pilot valve is preloaded to operate around a null position and will deviate from the null position when the pressure drop across the metering valve is greater than or less then a pressure at the null position.

8. The fuel flow system of claim 7, wherein the pilot valve directs the portion of the high pressure fluid or the portion of the low pressure fluid to the integrating bypass valve when the pilot valve deviates from the null position.

9. The fuel flow system of claim 1, wherein the integrating bypass valve is a half area servo having a stepped diameter such that the integrating bypass valve is in force balance when the pressure signal is half way between a high pressure and a low pressure by an area ratio of the integrating bypass valve.

10. The fuel flow system of claim 1, and further comprising:
    a check valve, which when open, directs fuel flow from the second pump to the metering valve,
    wherein the pilot valve senses the pressure drop across the metering valve by reading a high pressure from a location upstream from the metering valve and downstream from the first pump and by reading a low pressure from a location upstream of the inlets of the first and second pump and downstream from a boost pump.

11. A method for controlling a fuel flow system for a gas turbine engine, the method comprising the steps:
    dividing fuel flow from a source between an inlet of a first pump and an inlet of a second pump;
    directing a first portion of the fuel flow from the first pump to an actuator, the actuator returning the first portion of the fuel flow upstream from the inlet of the first pump and the inlet of the second pump;
    directing a second portion of the fuel flow from the first pump through a metering valve located downstream of the first pump;
    controlling flow of a third portion of the fuel flow from the first pump through a bypass loop and back to the inlets of the first and second pumps with a first window of an integrating bypass valve, wherein the third portion of fuel flow from the first pump is in excess of flow requirements of the metering valve;
    controlling the fuel flow from the second pump through the bypass loop and back to the inlets of the first and second pumps with a second window of an integrating bypass valve; controlling the size of the first and second windows with a pilot valve; and wherein controlling the size of the first and second windows with the pilot valve comprises: sensing a pressure drop across the metering valve; responding to the pressure drop by directing either a portion of the fuel flow upstream from the actuator and downstream from the first pump or a portion of the fuel flow downstream from the actuator to a single side of the integrating bypass valve until a regulated pressure setting is achieved.

12. The method of claim 11 and further comprising:
    controlling the fuel flow from the second pump to the metering valve with a check valve.

13. The method of claim 11, wherein controlling the size of the first and second windows with the pilot valve further comprises:
    preloading the pilot valve to operate around a null position, wherein the pilot valve deviates from the null position when the pressure drop across the metering valve is greater than or less then a pressure at the null position.

14. The method of claim 13, wherein controlling the size of the first and second windows with the pilot valve further comprises:
    directing either a portion of the fuel flow upstream from the actuator and downstream from the first pump or a portion of the fuel flow downstream from the actuator to a single side of the integrating bypass valve when the pilot valve deviates from the null position; and
    returning the pilot valve to the null position when the regulated pressure setting is achieved.

15. The method of claim 11, wherein the first window fully closes before the second window fully closes.

16. The method of claim 11, wherein the second pump has a larger capacity than the first pump.

17. The method of claim 11, wherein the first window and the second window vary with a pre-determined relationship.

* * * * *